Figure 2:
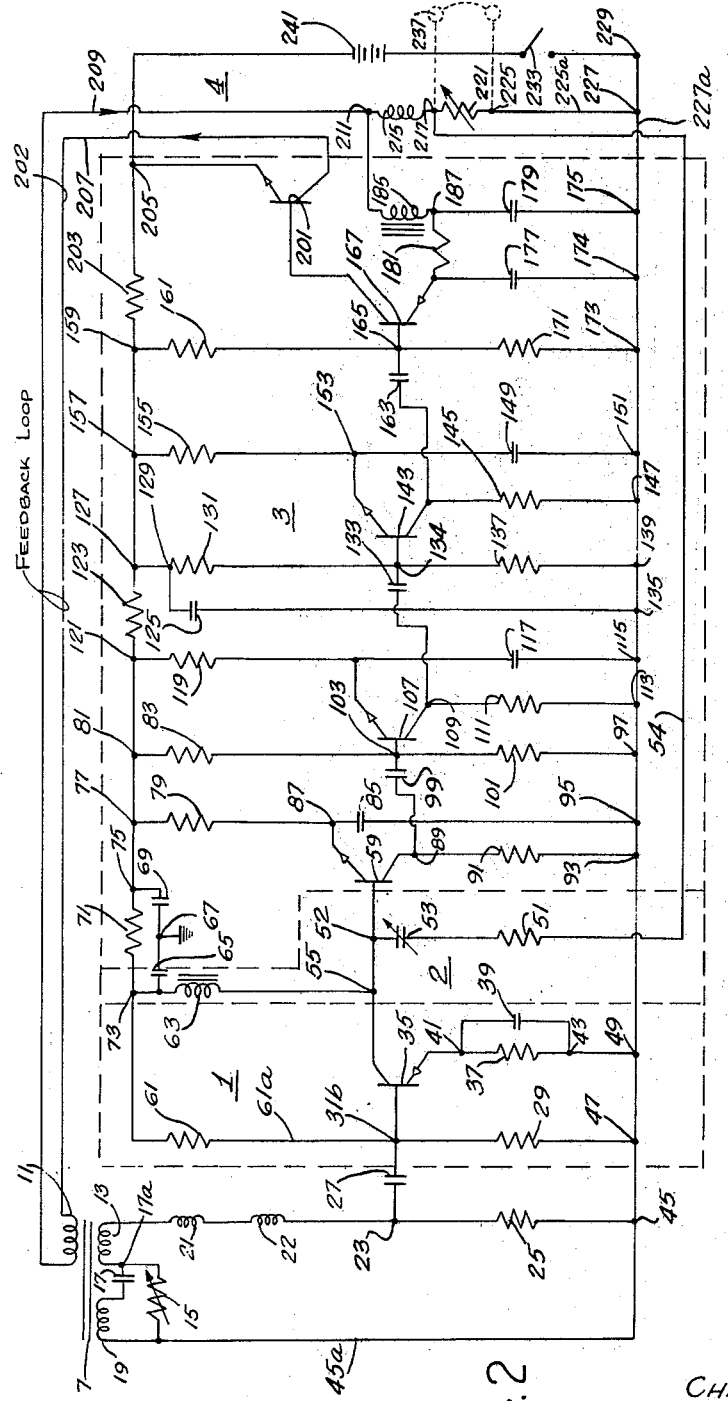

Aug. 24, 1965 C. STEWART 3,202,909
VARIABLE FREQUENCY OSCILLATOR TYPE OF METAL DETECTOR
SENSITIVE TO MUTUAL RESISTANCE CHANGES
Filed Jan. 22, 1964

INVENTOR
CHANDLER STEWART
BY
ATTORNEY

United States Patent Office 3,202,909
Patented Aug. 24, 1965

3,202,909
VARIABLE FREQUENCY OSCILLATOR TYPE OF METAL DETECTOR SENSITIVE TO MUTUAL RESISTANCE CHANGES
Chandler Stewart, Alexandria, Va., assignor to the United States of America as represented by the Secretary of the Army
Filed Jan. 22, 1964, Ser. No. 339,564
1 Claim. (Cl. 324—3)
(Granted under Title 35, U.S. Code (1952), sec. 266)

The invention described herein may be manufactured and used by or for the Government of the United States of America for governmental purposes without the payment of any royalty thereon to me.

This application is a continuation-in-part of my co-pending application Serial Number 171,327, filed January 31, 1962, now abandoned, for Variable Frequency Oscillator Type of Metal Detector Circuit.

This invention relates generally to improvements in metal detector circuits and, more particularly, to a metal detector system employing a phase shift variable frequency oscillator (VFO) circuit component.

It has been found that the VFO principle employing audio frequencies offers many potential advantages in metal and mine detection over prior types of metal detectors. The prior types registered a soil detection signal requiring a finite time for the disappearance thereof and rendering impossible the rapid sweep of a field to be detected because of the persistence of the soil detection signals. Also, the prior types had for their outputs a constant frequency signal the amplitude of which varied to reveal metal detection. This constant frequency resulted in the deafness to that frequency for the operator of the detector.

The instant invention eliminates the production of an output signal that is a function of the soil in which the metal is to be detected. This absence of soil output signals is termed "soil discrimination." As a result, an area of soil can be swept as rapidly as physically possible without extraneous signals due to the presence of the soil alone. Further, the output of this detector is a signal the frequency of which is significant of the presence or absence of metal. No fatigue in the hearing of the operator will interfere with his detecting these frequency changes and the detection attains an accuracy not available with the prior detectors.

In addition, the present invention employs a metal detector having a feedback network to achieve maximum bandwidth of audio frequencies. These audio frequencies are obtained from the VFO without the use of a beat frequency oscillator as does the prior art, a substantial savings of circuitry. Further, phase selection circuits are included for automatic compensation of the effects from magnetically susceptible soils and frequency drift due to thermal effects.

The system of this invention utilizes changes in mutual resistance between the search head coils thereof caused by the detected metal for the significant output. Changes in mutual inductance do not affect the output signals.

The definition of feedback as used in this specification is the same as that which is well known in the art as applied to radio frequency amplifiers. See Radio Engineers Handbook (1943) by Terman, pages 395 through 406, published by McGraw-Hill Book Company, New York, New York.

It is, therefore, an object of this invention to provide a metal detector system incorporating a variable frequency oscillator circuitry.

A further object of this invention is to provide a metal detector system in which soil signals are eliminated from the output signals.

A still further object of this invention is to provide a metal detector system in which the output intelligence is in the form of audible frequency variations.

Another object of this invention is to provide a metal detector system in which phase selection circuitry is included to compensate for magnetic susceptibility in soils and drift due to thermal effects.

Still another object is to provide a metal detector system which is sensitive to changes in mutual resistance between the search head thereof and objects to be detected.

Yet another object of this invention is to provide a metal detector which is insensitive to changes in mutual inductance between the search head coils thereof caused by objects within the realm of its influence.

A further object of this invention is to provide a metal detector system having a feedback network including a balanced coil search head having a gain sufficient to sustain oscillation of the system at any frequency in its operating range.

A still further object of this invention is to provide a detector system which is devoid of parasitic oscillations.

Another object of this invention is to provide a mine detector having a temperature stable transistorized circuit that obtains soil discrimination by phase selection and by use of audio frequencies.

It is a further object of this invention to provide a metal detector in which soil discrimination is unaffected by sweep speed of the search head.

It is an object of this invention to provide a metal detector circuit which provides a desired high target signal and a desired low soil signal.

It is another object of the instant invention to provide a metal detector of high reliability which avoids operator single-frequency tone deafness.

With these and other objects in view, the invention includes certain novel features, herein described with reference to the drawings which accompany and form a part of this specification.

Figure 1:
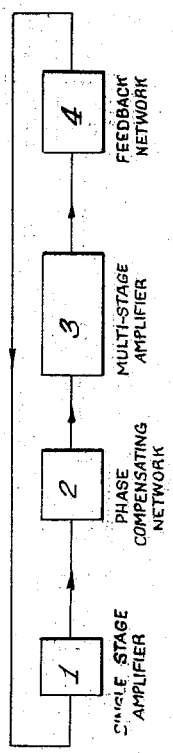

In the drawings:
FIGURE 1 is a block diagram of the variable frequency oscillator type of metal detector which embodies the present invention; and
FIGURE 2 is a schematic circuit diagram for the metal detector.

Briefly, the metal detector circuit of this invention can be described broadly as a variable frequency oscillator in which frequency changes are effected by changes in mutual resistance. The system of the present invention is made up of a plurality of amplifiers which have a total phase shift of one hundred eighty degrees over the operating range of the system; a feedback network which includes a balanced coil search head and a transformer with coupling resistors and capacitors wherein the balanced coils in the search head coupled with the resistors and capacitors through the transformer produce a phase angle less than ninety degrees and wherein the mutual inductance of the transformer connected to the outputs of the amplifiers provides a phase angle of exactly ninety degrees; and a compensating network which functions to bring the total phase angle to three hundred and sixty degrees. The system includes enough amplifiers that the feedback network exceeds unity throughout the operating range of the system.

Referring to FIG. 1, the metal detector comprises a single stage voltage amplifier 1 which supplies an output to a phase compensating network 2 which is used to compensate for phase shifts in the input loop portion of the feedback network as the results of the phase compensation being independent of frequency. The output of network 2 is fed into a multistage current amplifier 3 having medium alpha units (current gain of a transistor) to lessen the phase shift. The current output of the multistage amplifier 3 is fed into feedback network 4 which contains a search head. A feedback voltage is taken from the output stage of the feedback network 4 and returned to the single stage amplifier 1 for maximum performance effectiveness, including sensitivity and discriminator ratio ($S/T$) of the search head. Sensitivity may be considered as the ability of a detector to sense a metallic target. Detectors with identical search heads may be compared by using standard metallic pins and magnetite blocks as targets and noting, in the case of a VFO, the changes in frequency due to block and pin. The $S/T$ ratio is the ratio of a change in frequency of the VFO due to the steel pin to the change in frequency due to the magnetite block. This ratio reflects the sensitivity of the detector and also its ability to reject a magnetic target. An ideal detector would have an infinite $S/T$ ratio.

FIG. 2 of the drawings is a schematic circuit diagram of a transistor VFO type of metal detector. The transistors of the circuit are combined uniquely in complementary circuits to eliminate components, to obtain an improved frequency response, sensitivity, electronic balance, and insure thermal stability of the transistors during operation of the metal detector. While the preferred embodiment of this invention has illustrated the use of transistors of the junction type in the circuit of FIG. 2, it is to be understood, that this invention is not limited to transistors of the NPN, or PNP junction type but may employ transistors of the point contact type, as well as electronic tubes. In the embodiment of this invention the NPN and PNP junction transistors can be transposed in the various sections of the circuit by a reversal of the electrodes and battery potentials.

The electrical components designated by a reference numeral in each block of the diagram in FIG. 1, are similarly designated by like reference numerals in a dotted block portion in FIG. 2.

The single stage amplifier 1 of FIG. 1 as incorporated in FIG. 2 comprises transistor 35 having a semiconductive body, a base electrode, an emitter electrode, and a collector electrode in a transistor amplifier circuit. In general, this circuit comprises resistors 61 and 29 connected to the base connection of transistor 35, which has a transistor collector terminal connected to junction 55 and a transistor emitter terminal connected by resistor 37 and capacitor 39 in parallel to junction 49 of the detector circuit.

The phasing network 2 is used to compensate for phase shifts in the input loop portion of the feedback network and the compensation is substantially independent of frequency.

Phase compensating network 2 of FIG. 1 as illustrated in FIG. 2 comprises, in general, junction 73 connected by choke means 63 and by junctions 55 and 52 to variable condenser 53 which serves as a phase shifting means of the circuit and is connected by resistor 51 and lead 54 to junction 217. By varying the capacitance 53 in the phasing network 2 of FIGS. 2 and 1, respectively, compensation is obtained for phase shifts in the input loop portion of the feedback network, such that the compensation is independent of frequency.

The unitary power supply 241 of the detector circuit of FIG. 2 as shown, may be a battery or other desired unitary power supply well known in the art.

The earphone hearing means 237 in dotted outline of FIG. 2 may be connected across junctions 217 and 225, the volume of which may be adjusted by variable resistance means 221.

The search head means of instant invention may include oscillator-modulator circuit means (in housing means attached to a handle or other desired transport means not shown) with transmit coil 215 and receive coil means 21 and 22 of the detector circuit of FIG. 2. The receiver coils 21 and 22 are symmetrically disposed electrically with respect to the transmit coil 215 and series opposed with respect to each other with the net result that the mutual inductance across the receiver coils is zero.

Multistage amplifier 3 of FIG. 1 as incorporated in FIG. 2, in general, comprises transistors 59, 107, 143, and 167 in cascade, in which the collector of transistor 167 is connected to the base electrode of transistor 201. Transistor 59 of the first stage of the multistage amplifier 3, has a base terminal connected to the collector of transistor 35. The emitter electrode of transistor 59 is connected by resistance 79 to terminal 77 and by capacitor 85 to terminal 95. The collector electrode of transistor 59 is connected to junction 89. Junction 89 is connected by capacitor 99 and junction 103 to base electrode of second stage transistor 107. Junction 89 is also connected by resistance 91 to junction 93. Junction 103 is connected by resistance 83 to junction 81 and to junction 97 by resistance 101. The emitter of transistor 107 is connected by resistance 119 to junction 121 and also connected by capacitance 117 to junction 115. The collector terminal of transistor 107 is connected by resistance 111 to junction 113 and also connected by capacitance 133 to junction 134. Junction 134 is connected by resistance 131 and junction 129 to junction 127 and by resistance 137 to junction 139. Junction 129 is connected by capacitor 125 to junction 135. Junction 134 is also connected to the base electrode of the third stage transistor 143. The collector electrode of transistor 143 is connected by resistance 145 to junction 147 and by coupling condenser 163 to junction 165. The emitter electrode of transistor 143 is connected to junction 153. Junction 153 is connected by resistance 155 to junction 157. Likewise, junction 153 is connected by capacitance 149 to junction 151. Junction 73 is connected to junction 75 by resistance 71 and capacitances 65 and 69 in parallel arrangement. Capacitors 65 and 67 are grounded by junction 67. Junction 121 is connected by resistance 123 to junction 127. Junction 159 is connected to junction 205 by resistance 203. Junction 165 is connected directly to base electrode of transistor 167 and by resistor 171 to junction 173 and by resistor 161 to junction 159. The collector electrode of transistor 167 of the fourth stage of amplifier 3 is connected to the base electrode of transistor 201. The emitter of transistor 167 is connected by condenser 177 to junction 174 and by resistor 181 to junction 187. Junction 187 is connected by choke 185 to junction 211 and by capacitor 179 to junction 175. Feedback coil 11 is connected by lead 202 to collector electrode of transistor 201 by lead 209 to junction 211 and search head transmit coil 215. Transistor 201 employs a grounded emitter output stage and was added to increase the gain of the circuit.

Stabilization of the transistor in each stage of the multistage amplifier 3 is obtained by using a combination of current and voltage feedback for each stage. For example, resistances 119 and 83 between emitter and base electrodes of transistor 107 provide current feedback, while resistances 101 and 111 between collector and base electrodes of transistor 107 provide voltage feedback. Condensers 99, 133 and 163 are coupling condensers. Other refinements of the circuit for stabilization of the transistors at high temperature will become apparent to those skilled in the art.

The regenerative feedback loop or variable frequency oscillator loop of the detector is composed of inductance coil 11 and leads 202 and 209 of the detector circuit. Transformer 7 is the main source of coupling in the VFO loop and permits the VFO to oscillate in the absence of a target as well as in the presence of a target. The mutual impedance of transformer 7 determines to a large extent the amplifier gain requirements.

The neutralizing circuit of FIG. 2 is for proper adjustment for elimination of strong capacitances in search head coils 215 and 21 and 22 comprises, in general, secondary coils 19 and 13 of mutual coupling transformer 7, being interconnected by capacitor 17 and variable resistance 15. Coil 13 is connected in series with search head receive coils 21 and 22 which are connected to junction 23 and resistance 25 to junction 45 of the detector circuit. It has been experimentally determined that the voltage developed across the neutralizing resistor 15, when driven by a secondary winding 19 in series with the capacitor 17, can be adjusted to compensate for stray capacitances between the search head coils 215 and 21 and 23 over a wide frequency range. This range is greater than the range required for operation of this system.

Battery 241 and switch means 233, for energizing the circuit, are connected to junctions 205 and 227 as shown in FIG. 2.

It is to be noted that instant detector circiut of FIG. 2, by design of circuit components uniquely employs the base-collector paths of a number of transistors in cascade and utilizes only one voltage source 241 as a means of energizing the detector circuit which makes for lighter weight, compactness and portability.

The feedback network 4 of FIG. 1, as shown, in circuit detail in FIG. 2, in general comprises feedback loop containing primary coil 11 connected to lead 207 and lead 209 terminating at junction 211, search coil 215 interconnecting junction 217 with lead 54. The secondary circuit portion of the feedback network 4 of FIG. 1 comprises in general the neutralizing circuit consisting of secondary coils 19 and 13 of mutual coupling transformer 7 interconnected by capacitor 17 across which is shunted variable neutralizing resistor 15 connected to lead 45a which is connected by junction 45 in series to resistor 25, junction 23 and search coils 21 and 22 interconnected in series to coil 13.

The receiver search coils 21 and 22 are magnetically coupled to the transmitter coil 215. The neutralizing circuit of the search head of the detector circuit is unique in that it is capable of tuning out or balancing inductive and capacitative reactances that may be extraneously introduced into or are inherently present in the search head which insures accurate metal to soil discrimination. The input stage of the search head circuit, in general, contains coil 22, coil 21, transformer 7 together with a neutralizing circuit which contains neutralizing coil 19, condenser 17 and variable neutralizing resistor 15. The output stage of the search head circuit contains in general, transmit coil 215 and its corresponding winding 11 of mutual coupling transformer 7.

In the operation of the metal detector of this invention, the search head, made up of coils 21, 22 and 215, is brought into proximity with the area to be explored. The presence of metal in the field of sensitivity of the search head introduces a mutual impedance between the transmitter coil 215 and the other two coils. This mutual impedance includes a substantial mutual resistance component as well as the inherent inductance. Any changes in the mutual inductance between search head coils 215 and 21, 22 will add linearly such as would be caused by the presence of soil to the mutual inductance of transformer 11. This inphase addition will not disturb the ninety degree mutual impedance phase angle and the frequency would not be altered. However, any changes in mutual resistance such as may be caused by the presence of metal objects between search head coils 215 and 21, 22 will add in quadrature vectorially to the mutual inductance of the transformer, thus causing a change in the ninety degree phase angle at the initial operating frequency. Since oscillation must occur at a frequency of exactly three hundred and sixty degrees total phase shift, the initial frequency will then change to a new frequency at which the phase shift introduced by the search head mutual resistance is offset by a phase change elsewhere, that is, in the input loop and the compensating network. Since these phase shifts are approximately constant with frequency, a relatively large frequency change will occur to produce the phase offset.

The phase offset is accomplished by the following interaction of circuit functions. The phase lag angle through the input loop portion of the feedback network is approximately arctan $\omega/R$, where R is the total resistance of the input circuit, consisting of search head coils 21 and 22; resistor 25 shunted by capacitor 27 in series with resistor 29 shunted by the input resistance of transistor 35; transformer winding 13, and the neutralizing circuit 15, $\omega$ is the operating frequency in radians per second, and L is the total inductance of the input circuit. The phase lag angle of the phase compensating network is approximately arc cot $Rp\omega Cp$, where R is the phase compensating resistor 51 and $Cp$ is the phase compensating capacitor 53. By choosing $Rp$ and $Cp$ so that $RpCp=L/R$, the aforesaid tangent and cotangent are equal to each other, and the angles are hence complementary, so that the combined phase lag of the input loop and the phase compensating network is approximately 90°, and the remaining amplifier stages contribute 180° phase shift over a wide frequency range, the total phase shift about the entire feedback loop of FIG. 1 is approximately 360° over a wide frequency range. Since oscillation will occur at a frequency of exactly 360° total phase shift, the frequency is extremely sensitive to small phase disturbances introduced by mutual resistances between the search head coils 215 and 21/22, such as those caused by the presence of metallic objects. It is the changes in the magnitude of the mutual resistance that enables this device to detect the presence of metallic objects.

A vectorial showing of the transformer mutual impedance would have added on to the arrow head thereof an aligned second arrow representing the in phase relationship of the mutual inductance change in the search head due to the presence of soil. However, the vector representatioin of the transformer mutual impedance as a first vector would have added a second vector which is not aligned with the first vector, but at an angle, which is representative of the mutual impedance change in the search head due to the presence of metal in the effective range of the search head. This second vector includes an inductance component which is aligned with the transformer mutual impedance vector to the arrow head end of ponent which is at right angles to the arrow head end of the inductance component. The resultant of the first and second vectors is a third vector which is the total feedback network mutual impedance, and the angle formed between the first and third vectors is the phase shift angle that the compensating circuit automatically adjusts to return the total phase shift to three hundred and sixty degrees and a corresponding frequency change is produced, said frequency change being indicative of the magnitude of the resistance component of the second vector.

The angle between the first and third vectors discussed above is such that very small changes in that angle result in very large changes in frequency over a wide operating range. By discrete selection of components and the compensating network in the input loop changes in the relationship of that angle to frequency from a very substantial slope, near 3 degrees per octave to a far less slope for a wide range of frequencies is provided. The range for that phase angle is from approximately one-tenth of one degree to about one degree and the frequency range is from about four hundred cycles per second to about two thousand cycles per second.

So it is seen that I have provided a very efficient and sensitive metal detector which eliminates the soil component from the output signals and which precludes single tone deafness of the operator.

It is to be understood that the above-described transistorized circuit is illustrative of the principles of this invention and that numerous arrangements may be devised by those skilled in the art without departing from the spirit and scope of the invention.

Furthermore, it will be seen that there has been provided by this invention a method and apparatus in which the various objects hereinabove set forth together with many thoroughly practical advantages are successfully achieved. As various possible embodiments might be made of the electrical features of the above invention and as the art may be varied in various parts, all without departing from the scope of the invention, it is to be understood that all matter hereinbefore set forth or shown in the accompanying drawings is to be interpreted as illustrative and not in a limiting sense.

I claim:

In a variable frequency oscillator type of metal detector: a search head means having a transmitter coil means and a pair of balanced receiver coil means, said transmitter coil means being spaced from said pair of balanced receiver coil means to provide a volume of magnetic flux lines and to avoid direct coupling between said coils; an input signal circuit including said pair of balanced coil means, feedback coupling means, an output means, and a neutralizing circuit means for minimizing inductive and capacitive reactances extraneously and inherently present in said search head to optimize metal to magnetic material discrimination; means serially connecting said neutralizing circuit, said feedback coupling means, said pair of balanced coil means, and said input signal circuit output means; a single stage amplifier having an input and an output, the input of said single stage amplifier capacitively coupled to said input signal circuit output means; a phase compensating circuit having an input and an output, said phase compensating circuit augmenting phase shifts to maintain a total detector circuit phase shift of substantially three hundred sixty degrees over a wide frequency range in the absence of mutual resistance coupling between said transmitter coil and said balanced coils, the input of said phase compensating circuit connected to the output of said single stage amplifier; a multistage amplifier having an input and an output, the input of said multistage amplifier connected to the output of said phase compensating circuit; feedback circuit means magnetically coupled to said feedback coupling means and said neutralizing circuit in said input signal circuit; and frequency indicating means; said feedback circuit, said transmitter coil means and said frequency indicating means connected in series with the output of the multistage amplifier; power supply means for energizing said transmitter coil means; said metal detector being responsive to mutual resistance component changes in said volume of magnetic flux lines in the presence of a metallic object and said metal detector being insensitive to mutual inductance component changes in said volume of magnetic flux lines in the presence of a magnetic material.

References Cited by the Examiner

UNITED STATES PATENTS 2,919,413   12/59   Charles _____ 324—3 X

FOREIGN PATENTS 574,808   1/46   Great Britain.

OTHER REFERENCES

Mine Detectors (publication), Wireless World, May 1946, pages 166–168.

Transistor Locator Finds Metal Fast, by Edwin Bohr, Radio Electronics, March 1958, page 62 only.

WALTER L. CARLSON, *Primary Examiner*.